United States Patent [19]

Currie et al.

[11] Patent Number: 4,510,342
[45] Date of Patent: Apr. 9, 1985

[54] HIGH VISCOSITY INDEX SYNTHETIC OILS AND SYNTHESIS THEREOF

[75] Inventors: Janie K. Currie, Russell Township, Geauga County; J. Robert Mooney, Chagrin Falls, both of Ohio

[73] Assignee: The Standard Oil Company, Cleveland, Ohio

[21] Appl. No.: 454,338

[22] Filed: Dec. 29, 1982

[51] Int. Cl.$^3$ ............................................. C07C 3/02
[52] U.S. Cl. .................................. 585/524; 585/7; 585/10; 585/512; 526/125; 526/135; 526/143; 526/144
[58] Field of Search .............. 585/512, 524, 537, 7, 585/10; 526/144, 125, 135, 143

[56] References Cited

U.S. PATENT DOCUMENTS

| | | | |
|---|---|---|---|
| 3,413,376 | 11/1968 | Cleary | 585/524 |
| 3,655,812 | 4/1972 | Langer | 585/524 |
| 4,287,091 | 9/1981 | Selman | 526/144 |
| 4,321,346 | 3/1982 | Ueno et al. | 526/144 |
| 4,395,358 | 7/1983 | Wristers | 526/144 |

FOREIGN PATENT DOCUMENTS

| | | | |
|---|---|---|---|
| 2217064 | 9/1974 | France | 526/144 |
| 838227 | 11/1960 | United Kingdom | 526/144 |
| 1081952 | 9/1967 | United Kingdom | 526/144 |

Primary Examiner—Delbert E. Gantz
Assistant Examiner—A. Pal
Attorney, Agent, or Firm—Maky, Renner, Otto & Boisselle

[57] ABSTRACT

A method for preparing synthetic oils characterized by a high viscosity index and prepared from 1-olefin is described. The method comprises polymerizing a 1-olefin or a mixture of 1-olefins in the presence of (a) at least one transition metal halide catalyst,
(b) at least one alkyl aluminum compound containing up to about 15 carbon atoms in each alkyl group and up to about 40 carbon atoms per molecule as a cocatalyst, and
(c) a saturated alkyl fluoride.

The homopolymers and copolymers prepared in accordance with the method of the invention generally are characterized by a high viscosity index such as between about 100 to 300. The homopolymers and copolymers are useful as synthetic lubricants and as additives to synthetic or mineral oil lubricants for modifying the viscosity index characteristics of the lubricants.

15 Claims, No Drawings

HIGH VISCOSITY INDEX SYNTHETIC OILS AND SYNTHESIS THEREOF

BACKGROUND OF THE INVENTION

This invention relates to the preparation of polymers derived from 1-olefins which are characterized as having a high viscosity index, and to a process for preparing such high viscosity index oils.

Olefins can be polymerized cationically using a wide variety of catalysts. The Ziegler-Natta catalysts also have been used to polymerize olefins. The polymerized olefins obtained by prior art processes vary from low viscosity oils to high molecular weight solid polymers and copolymers. Generally, the characteristics of the polymerized olefins will depend upon and can be regulated by variations in the nature of the olefin or olefin mixture, type of catalyst or catalyst system utilized, the reaction conditions, etc. Considerable effort has been expended in recent years to develop polymers and copolymers containing 1-olefins having certain viscosity characteristics for use as synthetic lubricants and as additives for synthetic oils or mineral oils or mixtures of synthetic/mineral oils to provide modified and desirable viscosity characteristics.

In order to maximize the utility of polymerized olefins as useful additives for lubricating oil applications, it generally is preferred that the polymerized olefin be a liquid to be miscible in the lubricating oil. Accordingly, it is preferred that the polymerized olefin to be incorporated in a lubricating oil be a liquid rather than a solid. Catalyst systems have been suggested in the prior art for preparing polymers of monoolefins which are liquids. However, many of the liquids thus obtained are found to have a low viscosity index, and when added to lubricating oil compositions, the result is an undesirable lowering of the viscosity index of the lubricant.

European patent application, Publication No. 0021634 describes the preparation of synthetic lubricating oils wherein certain olefinic monomers such as ethylene, propylene and a third 1-olefin are copolymerized and thereafter dewaxed by means of a urea adduction process. The polymerization is conducted in the presence of a catalyst system comprising (a) a vanadium-containing catalyst, (b) an aluminum-containing catalyst, and (c) hydrogen. The synthetic oil prepared in this manner can be blended with other synthetic or mineral oils.

U.S. Pat. No. 3,101,327 describes a process for preparing olefin polymers having a high melt index. The increased melt index is obtained by conducting the polymerization of the olefin in the presence of certain unsaturated halogen-containing compounds. In particular, the process involves conducting the polymerization in the presence of a catalyst comprising an alky aluminum compound and a titanium halide. Optionally, a third catalyst component can be used which is an organic halide or metal halide.

U.S. Pat. No. 2,944,048 describes another catalyst composition useful in polymerizing olefins such as ethylene. The catalyst composition described in this patent comprises (1) a metal halide such as titanium halide, (2) a hydride such as aluminum hydride, and (3) an organic halide which may be an alkyl, cycloalkyl, alkenyl, aryl radical. It is indicated in this patent that the use of such a catalyst system results in polymers of higher molecular weight and high melt index.

The production of synthetic polymer oils is described in U.S. Pat. No. 3,121,061. The lubricating oils described in this patent comprise blends of two or more polypropylene fractions, one of which boils in the kerosine boiling range, and the other which boils in the "gas oil" boiling range. The polypropylene fractions are obtained from polypropylene obtained by the polymerization of propylene utilizing boron trifluoride as the catalyst and sulfuric acid as a promoter.

SUMMARY OF THE INVENTION

A method for preparing synthetic oils characterized by a high viscosity index and prepared from 1-olefin is described. The method comprises polymerizing a 1-olefin or a mixture of 1-olefins in the presence of
  (a) at least one transition metal halide catalyst,
  (b) at least one alkyl aluminum compound containing up to about 15 carbon atoms in each alkyl group and up to about 40 carbon atoms per molecule as a co-catalyst, and
  (c) a saturated alkyl fluoride.

The homopolymers and copolymers prepared in accordance with the method of the invention generally are characterized by a high viscosity index such as between about 100 to 300. The homopolymers and copolymers are useful as synthetic lubricants and as additives to synthetic or mineral oil lubricants for modifying the viscosity index characteristics of the lubricants.

DESCRIPTION OF THE PREFERRED EMBODIMENTS

Synthetic oils having a high viscosity index can be prepared in accordance with the method of the present invention by polymerizing 1-olefins or mixtures of 1-olefins. Preferably, the 1-olefins are aliphatic olefins characterized by the general formula

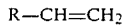

$$R-CH=CH_2$$

wherein R is hydrogen or a lower alkyl group containing up to about 6 carbon atoms. Examples of such olefins include ethylene, propylene, 1-butene, 1-pentene, 4-methyl-1-pentene, 1-hexene, 1-octene, and mixtures thereof. Preferably, the olefin is ethylene, propylene, or mixtures thereof.

The polymerization catalysts useful in the preparation of the synthetic oils of the invention comprise a mixture of
  (a) at least one transition metal halide catalyst, and
  (b) at least one alkyl aluminum compound as a co-catalyst.

The transition metal halide catalyst may be any of the transition metal halides generally known to be useful such as Ziegler-Natta catalysts for polymerizing olefins. Among the preferred transition metals are titanium, zirconium and hafnium. Germanium also is useful. Examples of the halides of such metals include titanium dichloride, titanium trichloride, titanium tetrachloride, titanium dibromide, titanium tribromide, titanium tetrabromide, titanium diiodide, titanium triiodide, titanium tetraiodide, titanium trifluoride, titanium tetrafluoride, zirconium dichloride, zirconium trichloride, zirconium tetrachloride, zirconium dibromide, zirconium tribromide, zirconium tetrabromide, zirconium tetraiodide, zirconium tetrafluoride, hafnium trichloride, hafnium tetrachloride, hafnium triiodide, hafnium tetraiodide, germanium dichloride, germanium trichloride, germanium tetrachloride, germanium dibromide, germanium tetrabromide, germanium diiodide, germanium tetraiodide, germanium difluoride, germanium tetrafluoride and the like. Mixtures of two or more of the metal halides can be employed in the catalyst system of the invention.

The catalyst may comprise a mixture or reaction product of transition metal halides and Lewis acids such as aluminum halides and boron halides. An example of such a combined catalysts is TiCl$_3$·⅓AlCl$_3$. Transition metal halides supported on inorganic materials are active catalysts useful in this invention. Examples of support materials include inorganic metal halides or oxides such as MgCl$_2$, AlCl$_3$, silica, alumina, MgO, ZnO, etc. A specific example of a supported catalyst is TiCl$_4$ on an MgCl$_2$ support.

The co-catalyst, employed in the process of this invention is an alkyl aluminum compound. These are compounds of aluminum having the valence linkages thereof individually bonded to groups such as hydrogen, alkyl groups or halogen atoms so long as at least one of the valences is bonded to an alkyl group. The alkyl groups each may contain up to about 15 carbon atoms or more, and the total number of carbon atoms in the alkyl aluminum compound may be as high as 40. Specific examples of such alkyl aluminum compounds include triethylaluminum, ethylaluminum dichloride, diethylaluminum chloride, trioctylaluminum, tridodecylaluminum, dimethylaluminum chloride, diisobutylaluminum bromide, and mixtures thereof. In some instances the alkyl aluminum can be replaced by other organometallic materials such as alkyl magnesium, alkyl lithium and alkyl copper compounds, alkyl gallium, alkyl indium, and alkyl beryllium compounds. Examples of such co-catalysts include dimethyl beryllium, tri-n-propyl gallium, trimethyl indium, ethyl beryllium chloride, methyl magnesium chloride, ethyl lithium, dimethyl copper lithium.

The amount of catalyst and co-catalyst utilized in the process of this invention can vary over a wide range. Relatively small amounts of the catalyst and co-catalyst provide desired activating effect, and the relative ratio of catalyst and co-catalyst also can be varied over a wide range. Thus, the total amount of catalyst and co-catalyst used in the process of the invention may be as little as 0.0001 weight percent to as much as 2.0 percent or higher of catalyst based on the weight of the monomer charged.

In the preparation of the catalyst and co-catalyst mixture utilized in the present invention, namely, the mixture of transition metal halide and the alkyl aluminum compound, the two components are brought into contact in the presence of an inert diluent in a confined reaction zone under an inert atmosphere. A wide range of relative amounts of the two components can be used in the invention, and in terms of formula weight ratios of the transition metal halide compound to the alkyl aluminum compound, ratios of from about 1:10 to about 10:1 are operable. The preferred ratios are in the range of 1:1 to 1:3. In the preparation of the catalyst mixture as in the operation of the polymerization process, it generally is desirable to employ inert liquids. Suitable inert liquids include hydrocarbons such as the hexanes, heptanes, octanes, decanes, etc., as well as inert aromatic hydrocarbons such as benzene, toluene, xylene, etc.

A critical feature of the process of the present invention is the inclusion in the reaction mixture of at least one saturated alkyl fluoride. When the alkyl fluoride is present in the polymerization mixture, the product is a viscous synthetic oil. In the absence of the saturated alkyl fluoride, the product of the polymerization is a much higher molecular weight solid polymer (e.g., highly crystalline isotactic polypropylene).

The saturated alkyl fluorides useful in the process of the invention include alkyl fluorides containing up to about 8 carbon atoms in the alkyl group and preferably lower alkyl fluorides containing 2 to 4 carbon atoms. Examples of such fluorides include ethyl fluoride, propyl fluoride, isopropyl fluoride, n-butyl fluoride, 1-hexyl fluoride, etc. Ethyl fluoride is the preferred alkyl fluoride in the process of the invention. Only small amounts of the saturated alkyl fluoride are required to obtain the desired synthetic oils, and generally amounts of from about 0.001 to about 15% by weight of the alkyl fluoride based on the weight of monomer is sufficient.

It has been discovered that variations in the sequence of additions of the various components can be made while still resulting in the formation of the desirable synthetic oil. For example, the saturated alkyl fluoride may be added to the reaction vessel either before or after the olefin. Also, the alkyl aluminum compound may be added to the transition metal catalyst either before or after the saturated alkyl fluoride is added.

In general, the process of the present invention is carried out in an inert atmosphere (e.g. nitrogen or argon) in the following manner. The transition metal catalyst component is introduced into the reaction vessel in the inert atmosphere. The catalyst may be introduced into the reactor as a powder. A slurry of the transition metal catalyst generally is utilized, and the slurry is prepared in a non-polar diluent such as hexane, heptane, light oil or a mixture of these diluents. Additional diluent may be introduced directly into the reaction vessel when desired. The co-catalyst, i.e., the alkyl aluminum compound, is added with stirring either neat or in solution. A small amount of alkyl fluoride then is added to the reaction vessel followed by introduction of the olefin monomer. The reaction is conducted generally for a period of from one to three hours or more at temperatures of from −50° to 100° C. Reaction times of from one to two hours at about 60° to 80° C. are preferred.

Depending upon the particular 1-olefin being polymerized, the pressures employed in the polymerization will vary from substantially atmospheric pressure to pressures as high as 100 atmospheres or higher. In one optional embodiment, the reaction vessel may be cooled to about 0° C. before adding the alkyl fluoride gas.

Upon completion of the polymerization reaction, the reactor contents are washed with a liquid such as a methanol/hydrochloric acid mixture, and the upper organic layer is collected. Generally the organic layer is dried and filtered, and the filtrate is evaporated to remove solvent and other volatile constituents leaving the desired polymeric synthetic oil.

The synthetic oils obtained in accordance with the process of the invention are characterized by their extremely high viscosity index. Viscosity indices of greater than 100 are readily obtained and more generally, viscosity indices greater than 200 and as high as 299 can be obtained.

The following examples illustrate the process of the present invention. Unless otherwise indicated, all parts and percentages are by weight.

EXAMPLE 1

To a bottle reactor containing 30 ml. of pure dry heptane there is added a heptane slurry containing 0.064 gm. of a commercial catalyst (Stauffer Chemical Company) comprising titanium trichloride and aluminum trichloride in a mol ratio of 3:1. An atmosphere of nitrogen is maintained throughout the addition and the reaction. Two mls. of a 25% by weight solution of diethylaluminum chloride in heptane is added and the reaction bottle is cooled. Ethyl fluoride (0.4 gm.) is added followed by 11.3 gms of propylene. The reaction mixture is heated and maintained at a temperature of 60° C. for about one hour whereupon the reaction is purged, evacuated, and the propylene reintroduced. After an additional hour at about 60° C., 11.1 gms. of a mobile clear oil is recovered from the reaction mixture. The clear oil is found to have a weight average molecular weight of about 1,000, a viscosity index of about 200 and a volumetric average boiling point of 589.1° F.

EXAMPLE 2

A mixture is prepared comprising 0.059 gm. of a titanium catalyst comprising titanium trichloride and aluminum trichloride in a mole ratio of 3:1, 30 mls. of heptane and 3 mls. of diethylaluminum chloride (25% by weight in heptane) in a reaction bottle maintained in an atmosphere of argon whereupon 0.4 gm. of ethyl fluoride and 11.5 gms of propylene are injected from gas cylinders. A reaction temperature of about 70° C. is maintained in a rotating bottle bath for a period of about two hours. The reaction bottle then is vented, quenched with a methanol/hydrochloric acid mixture, and 8.6 gms. of the desired organic oil is recovered. The oil is a clear pale yellow oil having a viscosity index of 299 and a volumetric average boiling point of 418.5° F.

EXAMPLE 3

The general procedure of Example 2 is repeated utilizing 0.0429 gm. of the titanium chloride/aluminum chloride catalyst, 2.0 ml. of the diethylaluminum chloride solution and 1 atmosphere of ethyl fluoride. In this example, the ethyl fluoride is added to the reactor vessel before the diethylaluminum chloride. An oil (7.06 gms.) is recovered having a viscosity index of 274 and a volumetric average boiling point of 453.3° F.

EXAMPLE 4

The procedure of Example 1 is repeated utilizing 0.06 gm. of the titanium chloride/aluminum chloride catalyst, 2.0 ml. of the diethylaluminum chloride solution, 0.7 gm. of ethyl fluoride and 10.1 gms. of propylene. A viscous oil (9.31 gms.) is obtained having a viscosity index of 117 and a volumetric average boiling point of 571.8° F.

EXAMPLE 5

The procedure of Example 1 is repeated except that 0.8 gm. of ethyl fluoride and 12.0 gms. of propylene are utilized. A viscous oil is recovered (11.4 gms.) having a viscosity index of 134 and a volumetric average boiling point of 549.2° F.

The synthetic oils prepared in accordance with the process of this invention are characterized by high viscosity indices. Accordingly, the synthetic oils of the present invention may be utilized as lubricating oils per se or utilized as viscosity index improving additives for lubricating oils. That is, when the synthetic oils of the present invention are added to a lubricating oil (either natural or synthetic), the viscosity index of the thus-produced lubricating oil can be improved as desired. In some instances it may be desirable to modify the polymer oils by further chemical treatment. For example the polymer oils may be treated with hydrogen to hydrogenate any unsaturated moieties remaining in the polymer upon completion of the polymerization reaction.

These lubricants include crankcase lubricating oils for spark-ignited and compression-ignited internal combustion engines, including automobile and truck engines, two-cycle engines, aviation piston engines, marine and railroad diesel engines, and the like. They can also be used in gas engines, stationary power engines and turbines and the like. Automatic transmission fluids, transaxle lubricants, gear lubricants, metal-working lubricants, hydraulic fluids and other lubricating oil and grease compositions can also benefit from the incorporation therein of the synthetic oils of the present invention.

Natural oils include animal oils and vegetable oils (e.g., castor oil, lard oil) as well as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propyleneisobutylene copolymers, chlorinated polybutylenes, poly(1-hexenes), etc; polyalkylbenzenes such as polydodecylbenzenes and polytetradecylbenzenes; and polyphenyls such as biphenyls and terphenyls.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers.

Another suitable class of synthetic lubricating oils comprises the esters of dicarboxylic acids such as phthalic acid, succinic acid, alkyl succinic acids and alkenyl succinic acids, maleic acid, azelaic acid, suberic acid, sebacic acid, fumaric acid, etc. Specific examples of these esters include dibutyl adipate, di(2-ethylhexyl)-sebacate, dioctyl sebacate, dioctyl phthalate and didecyl phthalate.

Esters useful as synthetic oils also include those made from $C_5$ to $C_{12}$ monocarboxylic acids and polyols and polyol ethers such as neopentyl glycol, trimethylolpropane and pentaerythritol.

Silicon-based oils such as the polyalkyl-, polyaryl-, polyalkoxy-, or polyaryloxy-siloxane oils and silicate oils comprise another useful class of synthetic lubricants. Examples include tetraethyl silicate, tetraisopropyl silicate and tetra-(2-ethylhexyl)silicate.

Generally, the lubricants of the present invention contain an amount of the synthetic oils of this invention sufficient to provide it with the desired viscosity characteristics. Normally this amount will be a minor amount, and generally 0.1 to about 25% or 1–10% by weight.

We claim:

1. A process for preparing high viscosity index synthetic oils from 1-olefins which comprises polymerizing a 1-olefin or mixture of 1-olefins in the presence of
   (a) at least one transition metal halide catalyst,
   (b) at least one alkyl aluminum compound containing up to about 15 carbon atoms in each alkyl group and up to about 40 carbon atoms per molecule as a co-catalyst, and
   (c) a saturated alkyl fluoride.

2. The process of claim 1 wherein the olefin is propylene.

3. The process of claim 1 wherein the transition metal is titanium.

4. The process of claim 1 wherein the alkyl fluoride is a lower alkyl fluoride containing from 2 to 4 carbon atoms.

5. The process of claim 1 wherein the alkyl aluminum compound is a trialkyl aluminum compound or an alkyl aluminum halide.

6. The process for preparing high viscosity index synthetic oils from propylene which comprises polymerizing propylene in the presence of
   (a) at least one titanium halide catalyst,
   (b) at least one alkyl aluminum halide containing up to about 4 carbon atoms in each alkyl group as a co-catalyst, and
   (c) a saturated alkyl fluoride containing up to about 4 carbon atoms in the alkyl group.

7. The process of claim 6 wherein the titanium halide catalyst comprises a mixture of titanium halide and an aluminum halide.

8. The process of claim 6 wherein the alkyl fluoride is ethyl fluoride.

9. The process of claim 7 wherein the titanium catalyst is a mixture of a titanium chloride and an aluminum chloride.

10. The process of claim 6 wherein the alkyl aluminum halide is a dialkyl aluminum chloride.

11. The process of claim 6 wherein the polymerization reaction is conducted in the presence of a non-polar diluent and at a temperature of from about $-50°$ to $100°$ C.

12. The process of claim 6 wherein the titanium halide catalyst is supported on an inorganic material.

13. A process for preparing a high viscosity index synthetic oils from propylene which comprises polymerizing propylene in the presence of
    (a) a catalyst comprising a mixture of a titanium halide and an aluminum halide
    (b) at least one alkyl aluminum compound containing up to 4 carbon atoms in each alkyl group, and
    (c) ethyl fluoride
    at a temperature of from about $-50°$ C. to about $100°$ C. in the presence of a non-polar diluent.

14. The process of claim 13 wherein the catalyst comprises titanium trichloride and aluminum trichloride in the mole ratio of 3:1.

15. The process of claim 13 wherein the alkyl aluminum compound is diethyl aluminum chloride.

* * * * *